(12) United States Patent
Sato et al.

(10) Patent No.: US 8,285,349 B2
(45) Date of Patent: Oct. 9, 2012

(54) SLIDING PORTABLE TERMINAL

(75) Inventors: Noriyoshi Sato, Yokohama (JP);
Kazuhiro Konishi, Yokohama (JP);
Kazunori Kono, Yokohama (JP);
Hiroshi Omura, Sendai (JP)

(73) Assignee: Panasonic Corporation, Osaka (JP)

( * ) Notice: Subject to any disclaimer, the term of this patent is extended or adjusted under 35 U.S.C. 154(b) by 555 days.

(21) Appl. No.: 12/514,791

(22) PCT Filed: Nov. 14, 2007

(86) PCT No.: PCT/JP2007/072122
§ 371 (c)(1),
(2), (4) Date: May 13, 2009

(87) PCT Pub. No.: WO2008/059894
PCT Pub. Date: May 22, 2008

(65) Prior Publication Data
US 2010/0048264 A1  Feb. 25, 2010

(30) Foreign Application Priority Data

Nov. 14, 2006 (JP) .................................. 2006-307754
Mar. 29, 2007 (JP) .................................. 2007-088492

(51) Int. Cl.
*H04M 1/00* (2006.01)
*H04M 9/00* (2006.01)
(52) U.S. Cl. .................................. 455/575.4; 379/433.12
(58) Field of Classification Search ................. 455/575.4
See application file for complete search history.

(56) References Cited

U.S. PATENT DOCUMENTS

| 7,319,892 B2 * | 1/2008 | Kato ........................... 455/575.4 |
| 7,542,788 B2 * | 6/2009 | Lee ............................. 455/575.4 |
| 2003/0064688 A1 * | 4/2003 | Mizuta et al. .................. 455/90 |

FOREIGN PATENT DOCUMENTS

| JP | 60-165796 A | 8/1985 |
| JP | 11-331332 A | 11/1999 |
| JP | 2004-222173 A | 8/2004 |
| JP | 2005-210649 A | 8/2005 |
| JP | 2005-286994 A | 10/2005 |
| JP | 2006-115111 A | 4/2006 |

* cited by examiner

*Primary Examiner* — Wayne Cai
*Assistant Examiner* — Huy C Ho
(74) *Attorney, Agent, or Firm* — Seed IP Law Group PLLC (57) ABSTRACT

It is aimed to attain compatibility between a size reduction, a thickness reduction of a portable terminal and the ensuring of an energizing force is attained. An upper case 2 is coupled with a connecting portion 4 to proceed in a predetermined direction with respect to a lower case 3. Two cases 2, 3 have a close state in which they are overlapped mutually and an open state in which the upper case 2 is extended by moving in a predetermined direction. One end of a coil portion 33A is fixed to a second hole 46 and the other end of the coil portion 33A is fixed to a third hole 50, and the connecting portion 4 has a torsion coil spring 33 that applies an energizing force to two cases 2, 3 such that the cases 2, 3 are brought into the close state or the open state. The coil portion 33A is arranged in a clearance 56 that is formed by a part of two cases 2, 3 when the two cases oppose to each other in the moving direction, and the clearance 56 is arranged in a vicinity on a predetermined direction with respect to the third hole 50 in the close state.

4 Claims, 10 Drawing Sheets

SLIDING PORTABLE TERMINAL

TECHNICAL FIELD

The present invention relates to a portable terminal and, more particularly, a sliding portable terminal such as a cellular phone, a PDA, a camera, a notebook personal computer, or the like, which enables the user to choose a carry state, in which respective cases are superposed exactly such that a back surface of a first case and a front surface of a second case are faced each other, and an extended state, in which respective cases are extended by moving in parallel the front surface of the second case with respect to the back surface of the first case.

BACKGROUND ART

Recently a great number of cellular phones have been developed and are used. Various cellular phones have been developed, e.g., the folding type that can be opened/closed via a rotary hinge unit, the slide type that can be opened/closed via a slide unit, etc., in addition to the straight type showing a simple rod-like profile have been developed.

The sliding cellular phone is equipped with a slide mechanism that slides a first case over a second case relatively in a state that these cases are superposed in the vertical direction. This sliding cellular phone is constructed by a slide case fitted to one of the first case and the second case, a slider fitted to the other of the first case and the second case to slide over the slide case, and an elastic member provided between the slider and the slide case to slide/energize the slider from a predetermined slide position in the open direction and the close direction (see Patent Literature 1, for example).

Patent Literature 1: JP-A-2005-210649

DISCLOSURE OF THE INVENTION

Problems that the Invention is to Solve

A desired energizing force is required of such slide mechanism to prevent such situations that the case opens unexpectedly while the sliding cellular phone is held in hand or the case closes easily when a user is sending/receiving an e-mail or talking over the phone in a state that the cellular phone is extended. Therefore, an elastic member is provided in the slide mechanism. This elastic member is formed of a torsion coil spring, for example, and is provided between the slider and the slide case.

When the slide is slid with respect to the slide case from a predetermined slide position in the open direction and the close direction, the torsion coil spring is turned around one end of the elastic member fixed to the slide case. Accordingly, both a space in which the torsion coil spring whose coil portion is closed is present and a space in which the torsion coil spring whose coil portion is opened is present must be formed in advance. Therefore, a slide space of the torsion coil spring is always needed between the slider and the slide case. As a result, the slide mechanism consisting of the slider and the slide case needs a predetermined thickness, and thus the portable terminal having the slide mechanism becomes thick and it was difficult to downsize the portable terminal.

Also, the torsion coil spring needs the energizing force, as described above. Thus, it is desirable that the number of turns should be increased to reduce a produced stress, but a height of a space in which the coil portion is slid must be increased in such case. Therefore, a thickness of the slide mechanism must also be increased, and the like. As a result, it was difficult to attain compatibility between a size reduction of the slide mechanism and the ensuring of the energizing force.

Also, in many cases the user uses the portable terminal with a strap. The user brings the sliding portable terminal with the strap into the close state and then puts it into a pocket of trousers or a bag. When the user takes this sliding portable terminal with the strap out of the pocket, or the like, such user pulls this portable terminal out while holding this strap. At this time, the main body portion is opened unless a desired energizing force is applied to cause an increase of power consumption. Meanwhile, for example, when the upper case is closed by any force in such a situation that the user uses portable terminal while holding the lower case in walking, such user is forced to suspend the inputting operation of characters, etc. Therefore, a desired energizing force is also needed in the open state.

Also, when there were variation in manufacture, variation in a component dimension, and the like, in some cases a desired energizing force cannot be given and thus the open state or the close state cannot be maintained.

The present invention has been made in view of the above circumstances, and it is an object of the present invention to provide a sliding portable terminal that is cable of firstly reducing a thickness of a sliding portable terminal, secondly keeping a close state without fail without upsizing of an elastic member, thirdly preventing a failure of a magnet caused by a collision when the magnet and an attracted member that the magnet attracts are used to keep a close state or an open state, and fourthly prolonging a life by reducing a produced stress not to thicken (increase a height of) the elastic member.

Means for Solving the Problems

A sliding portable terminal set forth in claim 1 of the present invention, includes a first case, a second case, and a connecting portion which couples the first case and the second case. The two cases are moved to a close state in which the first case and the second case are overlapped to each other and a open state in which the first case is slid and extended with respect to the second case in a predetermined direction. The connecting portion has a spring that applies an energizing force to the two cases so that the two cases move to the close state or the open state. One end of a coil portion of the spring is fixed in a first position of the connecting portion that moves together with the first case, and the other end of the coil portion is fixed in a second position of the connecting portion on the second case side. The coil portion is arranged in a clearance formed by portions of the first case and the second case which are opposed to each other in a movement direction. The clearance is arranged on the predetermined direction side with respect to the first position in the close state.

According to this configuration, it is not needed to form in advance the space, in which the coil portion is positioned in the open state, while avoiding the interference between the coil portion and other components when the case mode is changed from the close state to the open state. Therefore, the space in the main body portion can be utilized effectively, and thus a size reduction of the main body portion can be attained.

The sliding portable terminal set forth in claim 2 of the present invention further includes a magnet held on the first case side, and an attracted member held on the second case side and attracted by the magnet. Any one of the magnet and the attracted member is provided in a third position.

According to this configuration, there is no necessity to form in advance the space, in which any one of the magnet or the attracted member is positioned in the open state. Therefore, the space in the main body portion can be utilized effectively, and thus a size reduction of the main body portion can be attained.

In the sliding portable terminal set forth in claim 3 of the present invention, in the sliding portable terminal set forth in claim 2, either one of the magnet and the attracted member has a restricting portion which restricts an amount of movement in the predetermined direction.

According to this configuration, a sliding force in the close state can be realized by an attracting force given by the magnet, and an impact force generated in the magnet when the magnet and the attracted member are opposed to each other can be relieved.

Also, the sliding portable terminal includes the first case, the second case, and the connecting portion which couples two cases slidably so that the first case moves in a predetermined direction with respect to the second case. The two cases are moved to a close state in which the first case and the second case are overlapped to each other and a open state in which the first case is slid and extended with respect to the second case in the predetermined direction. The connecting portion provides the magnet in a first position that moves together with the first case. The connecting portion provides the attracted member, which is attracted by the magnet, in a second position that moves together with the second case. The attracted member and the magnet apply an attracting force to the two cases such that the two cases are brought into the close state. Preferably any one of the magnet and the attracted member may be arranged in a third position that is arranged between the two cases and opposed to the moving direction. Also, preferably either one of the magnet and the attracted member has a restricting portion which restricts an amount of movement of the connecting portion in the sliding direction.

According to this configuration, there is no necessity to form in advance the space in which the other of the magnet or the attracted member is positioned in the open state. Therefore, the space in the main body portion can be utilized effectively, and thus a size reduction of the main body portion can be attained. Also, a force of holding the close state or the open state can be realized by an attracting force given by the magnet, and an impact force generated in the magnet when the magnet and the attracted member are opposed to each other can be relieved.

In the sliding portable terminal set forth in claim 4 of the present invention, in the sliding portable terminal set forth in claim 1, the elastic portion has a center coil portion whose one end is connected to a first arm portion fitted in the first position and whose the other end is connected to a second arm portion fitted in the second position. The center coil portion is formed of a large-diameter center coil portion and a small-diameter center coil portion. The small-diameter center coil portion is started and terminated at a vicinity of symmetrical positions of starting positions of two arm portions with respect to a center of the large-diameter center coil portion as a symmetrical axis on an uppermost face or a lowermost face of the center coil portion.

According to this configuration, a developed effective length can be extended not to increase a thickness of the center coil portion even when the small-diameter center coil portion is formed.

ADVANTAGES OF THE INVENTION

According to the present invention, there is no necessity to form the space, in which either of the coil portion and the magnet or the attracted member that the magnet attracts is positioned in the open state, in advance in the close state.

Therefore, the space in the main body portion can be utilized effectively, and thus a size reduction of the main body portion can be attained.

Also, an impact force generated when the magnet and the attracted member are opposed to each other or when the user lets the portable terminal fall can be relieved. Therefore, the failure of the magnet can be avoided. Also, even though variation in manufacture or variation in a component dimension is caused, the close state can be kept surely by an action of the attracting force.

Also, the small-diameter center coil portion is formed not to overlap or interfere with the arm portion of the torsion coil spring. Therefore, a developed effective length can be prolonged not to thicken (increase a height of) the torsion coil spring, a bending stress generated in the torsion coil spring can be reduced, and the life performance can be improved. Also, even when the torsion coil spring is deformed, no interference is caused between the arm portion and the small-diameter center coil portion. Therefore, the thickness of the center coil portion obtained after the deformation is not changed from that in the case where no small-diameter center coil portion is provided in the prior art.

BRIEF DESCRIPTION OF THE DRAWINGS

FIG. 1 A perspective view showing an external appearance of a sliding cellular phone in Embodiment 1 of the present invention, wherein (a) shows a closed state, and (b) shows an open state.

FIG. 6 A plan view of the connecting portion in Embodiment 1 of the present invention, wherein (a) shows a closed state, and (b) shows an open state.

FIG. 7 A sectional view of a main portion that passes through a center of a torsion coil spring in Embodiment 1 of the present invention, wherein (a) shows a closed state, and (b) shows an open state.

FIG. 10 A view showing a torsion coil spring in the prior art, wherein (a) is a plan view, and (b) is a center sectional view.

FIG. 11 A view showing a torsion coil spring in Embodiment 2 of the present invention, wherein (a) is a plan view, and (b) is a center sectional view.

DESCRIPTION OF REFERENCE NUMERALS

1 main body portion of a sliding cellular phone (portable terminal)
2 upper case (first case)
3 lower case (second case)
4 connecting portion
31 guide rail portion
32 base portion
33 torsion coil spring
33A coil portion 36 second magnet
38 sucking member
46 second hole
50 third hole
56, 57 clearance

BEST MODE FOR CARRYING OUT THE INVENTION

Embodiment 1

Embodiments of the present invention will be explained in detail with reference to the accompanying drawings hereinafter. Here, explanation will be made while applying the present invention to the sliding cellular phone as the sliding portable terminal.

Figure 1:
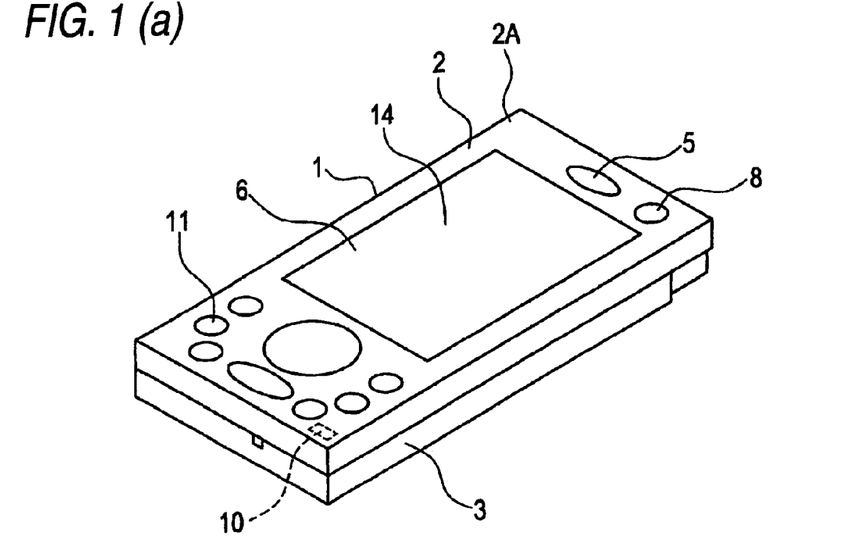
Figure 2:
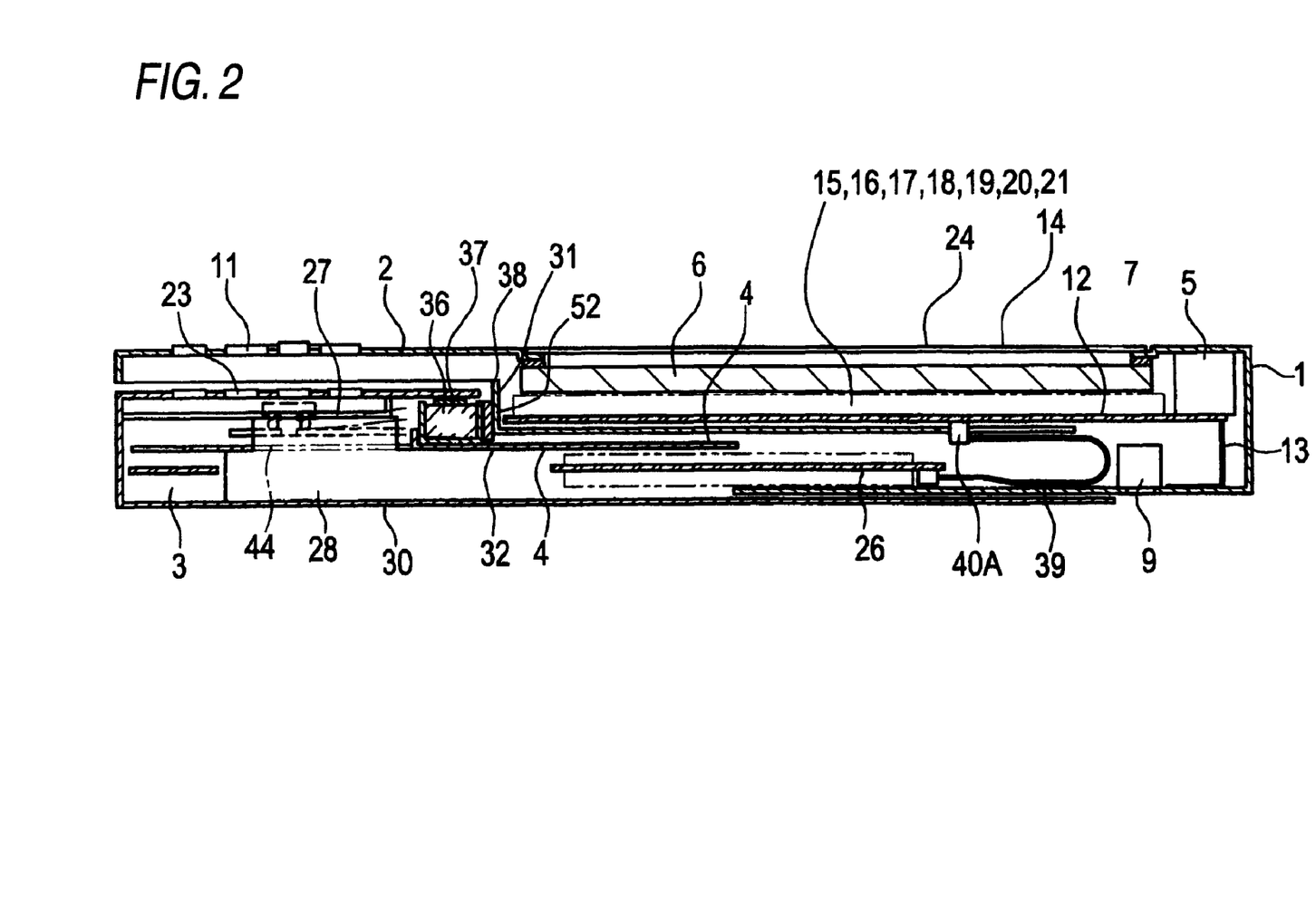
FIG. 2 A substantially center sectional view taken in FIG. 1.
Figure 3:
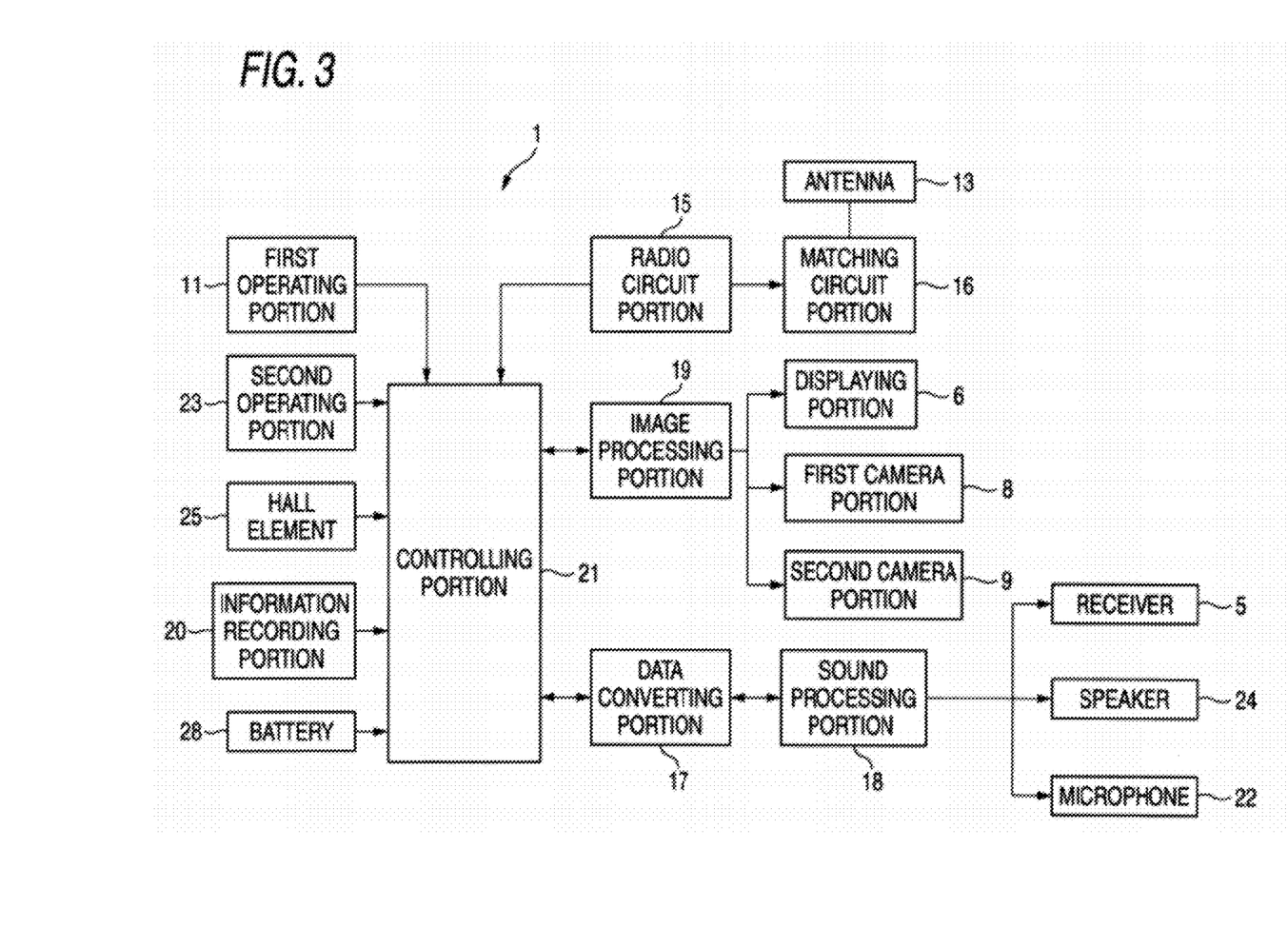
FIG. 3 A block diagram showing an electrical configuration of the sliding cellular phone in a case in Embodiment 1 of the present invention.
Figure 4:
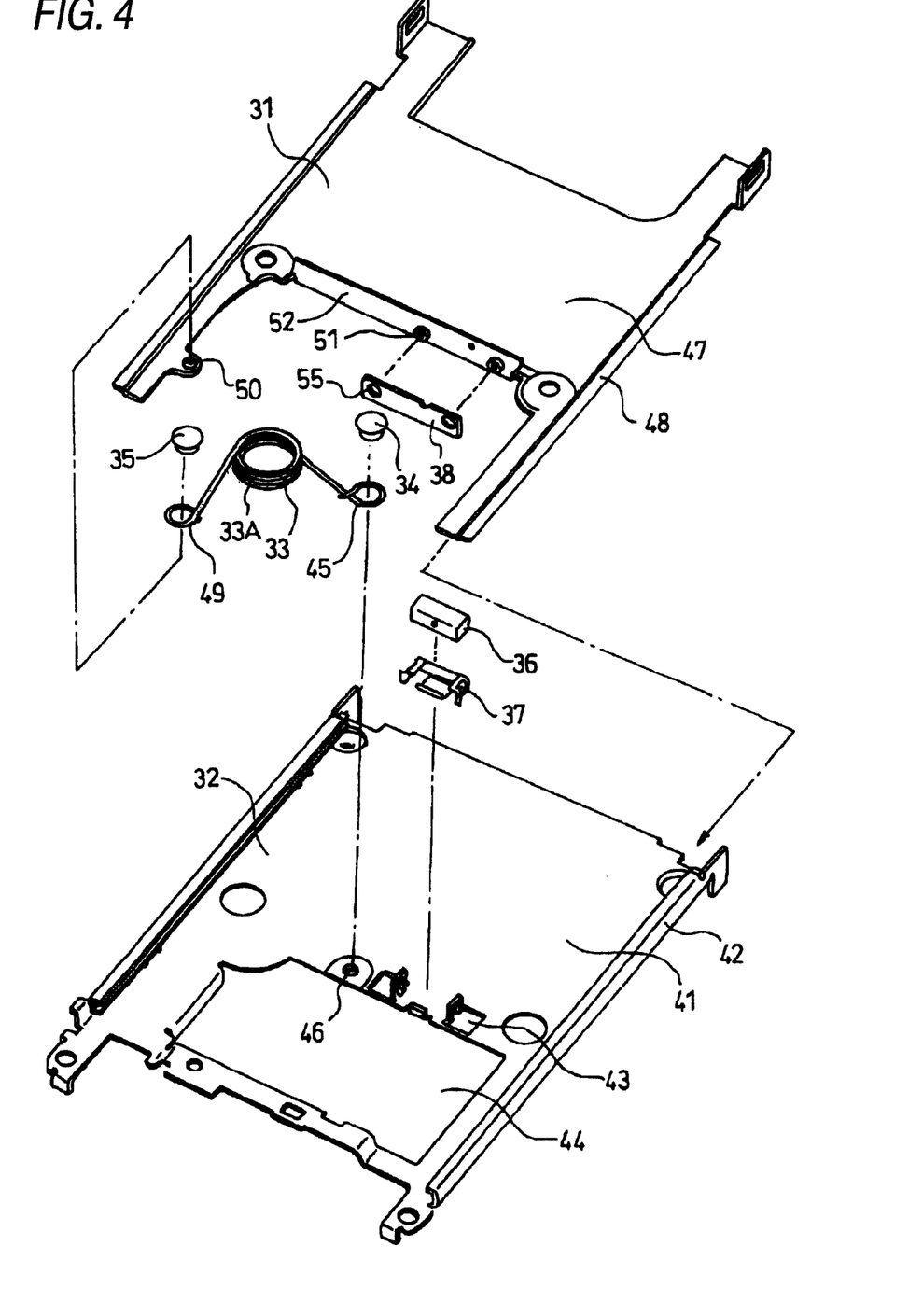
FIG. 4 An exploded perspective view of a connecting portion in Embodiment 1 of the present invention.
Figure 5:
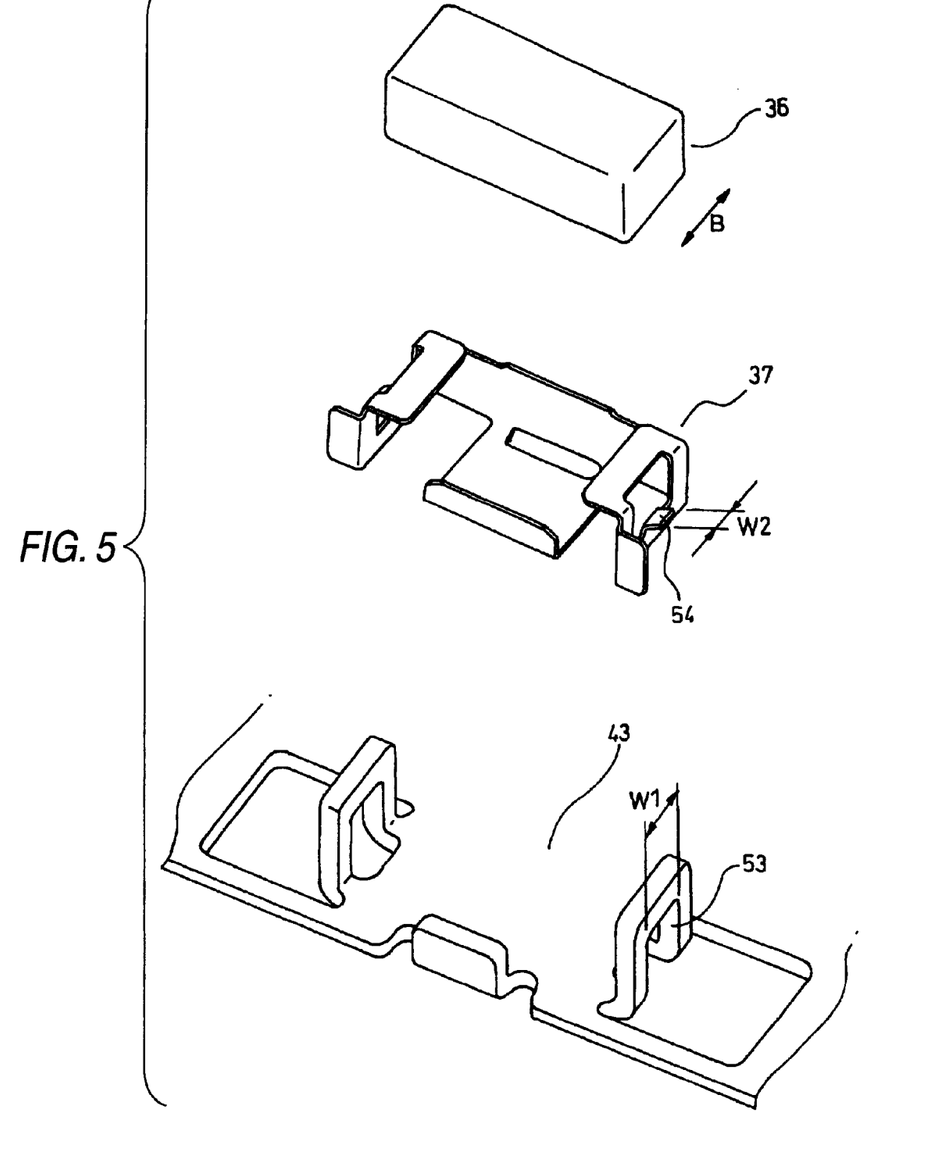
FIG. 5 A partial enlarged view of FIG. 4.
Figure 6:
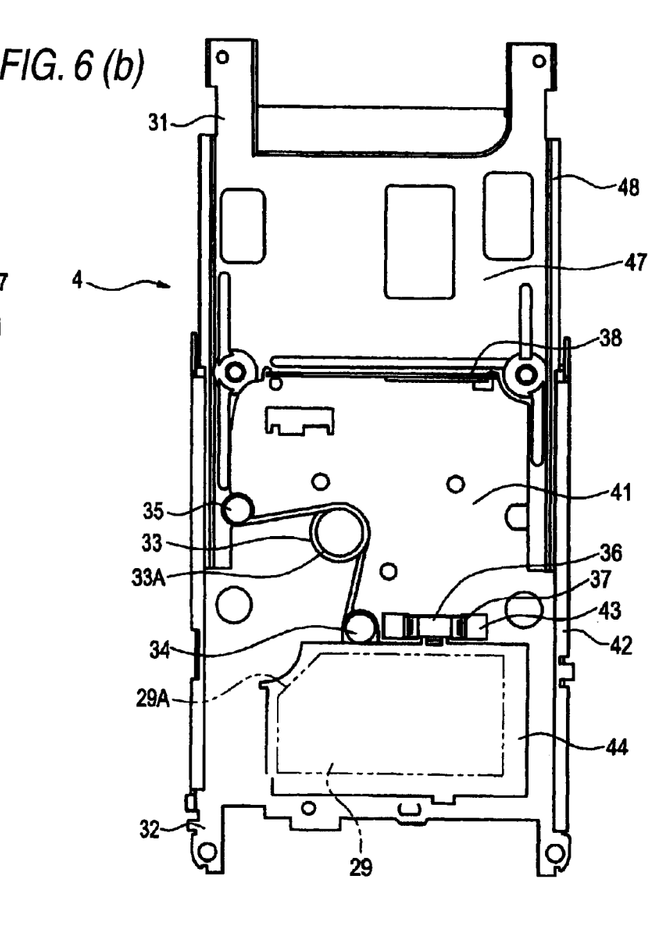
Figure 7:
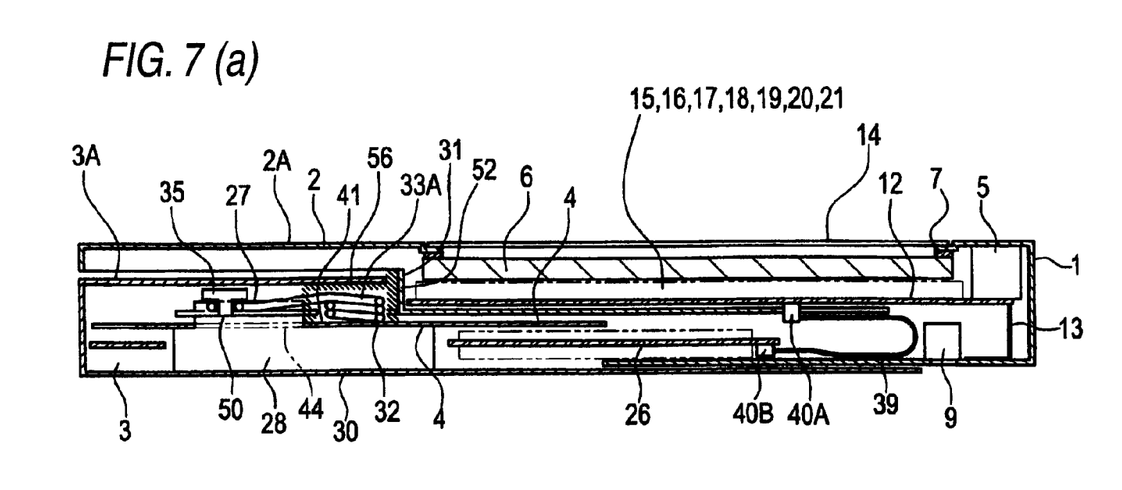
Figure 8:
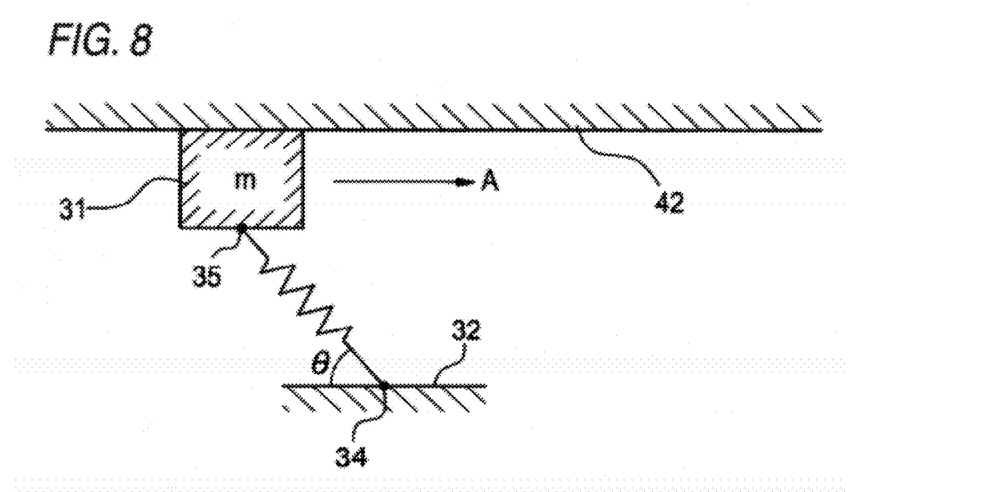
FIG. 8 A conceptual view in which the connecting portion is replaced with a spring-mass system.
Figure 9:
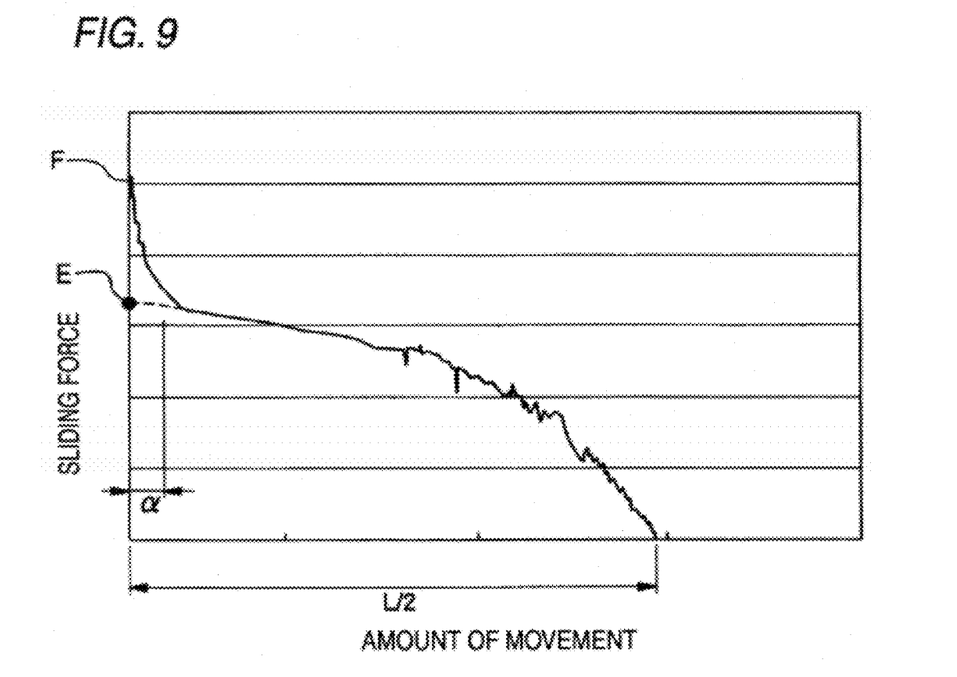
FIG. 9 A graph showing measured results of a sliding force applied when the main body portion is opened from its closed state to its opened state.

FIG. 1 is a perspective view showing an external appearance of a sliding cellular phone in Embodiment 1 of the present invention, wherein (a) shows a closed state, and (b) shows an open state. FIG. 2 shows a substantially center sectional view taken in FIG. 1. FIG. 3 is a block diagram showing an electrical configuration of the sliding cellular phone in a case in Embodiment 1 of the present invention. FIG. 4 is an exploded perspective view of a connecting portion in Embodiment 1 of the present invention. FIG. 5 is a partial enlarged view of FIG. 4. FIG. 6 is a plan view of the connecting portion in Embodiment 1 of the present invention, wherein (a) shows a closed state, and (b) shows an open state. FIG. 7 is a sectional view of a main portion that passes through a center of a torsion coil spring in Embodiment 1 of the present invention, wherein (a) shows a closed state, and (b) shows an open state. FIG. 8 is a conceptual view in which the connecting portion is replaced with a spring-mass system. FIG. 9 is a graph showing measured results of a sliding force applied when the main body portion is opened from its closed state to its opened state.

As shown in FIG. 1 to FIG. 3, a sliding cellular phone (referred to as a "main body portion" hereinafter) 1 of Embodiment 1 is constructed roughly such that two cases are coupled to slide one case over the other case. Explanation will be made hereunder on the assumption that one case of two cases is referred to as an upper case 2 and the other case is referred to as a lower case 3. The main body portion 1 has a connecting portion 4 that holds slidably the upper and lower cases 2, 3. The main body portion 1 is coupled slidably by a sliding operation of the connecting portion 4.

When the user carries the cellular phone or checks an incoming mail, the sliding cellular phone is used in a state that the main body portion 1 is closed (close state), as shown in FIG. 1(a). In contrast, when the user inputs characters, numerals, or the phone number, the sliding cellular phone is used in a state that the main body portion 1 is opened (open state), as shown in FIG. 1(b). The user can receive the call and end the call in either of the open state and the close state of the main body portion 1. Also, the upper case 2 moves in an arrow A direction by a distance L with respect to the lower case 3 when the main body portion 1 goes from the close state to the open state.

The upper case 2 has a receiver 5, a displaying portion 6, a display cushion 7, a first camera portion 8, a second camera portion 9, a first magnet 10, a first operating portion 11, a first printed board 12, and an antenna 13. A transparent window 14 is provided on a main surface 2A of the upper case 2. A radio circuit portion 15, a matching circuit portion 16, a data converting portion 17, a sound processing portion 18, an image processing portion 19, an information recording portion 20, a controlling portion 21, and the like are is provided to the first printed board 12. Also, a power feeding portion (not shown) is formed, and the antenna 13 is connected to the power feeding portion.

Meanwhile, the lower case 3 contains a mouthpiece portion (microphone) 22, a second operating portion 23, a speaker (shown only in FIG. 3) 24, a Hall element 25 used as a magnetic sensing element, a second printed board 26, a UIM card fitting portion 27, a battery 28 attached detachably, and the like. The second operating portion 23 is exposed on a main surface 3A of the lower case 3 when the main body portion 1 is in the open state. A UIM (User Identity Module) card 29 used as an IC card in which information of a contractor, phone number information, personal identification information, etc. are recorded (shown in FIG. 6) is fitted into the UIM card fitting portion 27 that is provided under the battery 28. The UIM card 29 can be exchanged in a state that a battery cover 30 for covering the battery 28 and the battery 28 are removed.

The connecting portion 4 couples the upper and lower cases 2, 3 slidably, and may be constructed integrally with the upper case 2 and the lower case 3. In Embodiment 1, the connecting portion 4 includes a guide rail portion 31, a base portion 32, a torsion coil spring 33, a first rivet 34, a second rivet 35, a second magnet 36, a housing member 37 in which the second magnet 36 is housed, and an attracted member 38. In order to change a mode of the main body portion 1 from the close state to the open state, the base portion 32 that is fixed to the lower case 3 by screws (not shown) can be slid along the guide rail portion 31 that is fixed to the upper case 2 by screws (not shown).

Also, a flexible printed board 39 (flexible wiring member) is folded and arranged between the upper case 2 and the lower case 3. One end of the flexible printed board 39 is inserted into a connector 40A that is provided to a surface of the first printed board 12 being directed to the lower case 3 side, while the other of the flexible printed board 39 is inserted into a connector 40B that is provided to a surface of the second printed board 26 being directed to the battery cover 30 side. Thus, the flexible printed board 39 connects electrically the first printed board 12 and the second printed board 26.

The top end side of the upper case 2 is formed thick in contrast to the rear end side that overlaps with the second operating portion 23 of the lower case 3. On the contrary, the top end side of the lower case 3 is formed thin in contrast to the rear end side that overlaps with the first operating portion 11 of the upper case 2. Also, in order to make it possible for the user to bring the cellular phone into the open state by sliding the main surface 2A of the upper case 2 upward with the user's thumb while holding the lower case 3 in one hand, it is preferable that the upper case 2 and the lower case 3 should be designed such that the user cannot grasp two cases 2, 3 simultaneously. Therefore, the user's hand that is holding the lower case 3 is made hard to touch the upper case 2 by forming the lower case 3 to surround both side surfaces of the upper case 2.

Next, respective constituent elements that the main body portion 1 of the sliding cellular phone in Embodiment 1 includes will be explained more concretely hereunder.

First, the upper case 2 will be explained hereunder.

The receiver 5 constitutes a first sound outputting portion, and outputs the voice of communication destination. When the call is incoming, the user presses the receiver 5 to user's ear and hears the caller's voice.

The displaying portion 6 is arranged under the transparent window 14 constituting a part of the main surface 2A via the display cushion 7. A mark indicating received electric field strength, remaining battery life information, time information, call incoming information, input characters and symbols, etc. are displayed on the displaying portion 6.

The user can recognize the display information displayed on the displaying portion 6 even when the main body portion 1 is in any state of the open state and the close state. The displaying portion 6 is constructed by a liquid crystal display (LCD), an organic EL, or the like. The displaying portion 6 is connected to the first printed board 12 via a display portion wiring member that is formed of a flexible printed-wiring board having flexibility, or the like.

The first camera portion 8 is provided adjacent to the receiver 5. At a time of the picturephone, an image picked-up by shooting the user is displayed on the displaying portion 6 as a mirror image, and this picked-up image as well as the voice is sent out to the party at the other end. Also, the first camera portion 8 has a face identification function, and decides whether or not the user's authenticity is true, by comparing the picked-up image with an image that is registered in advance.

The second camera portion 9 is provided at the back surface of the first camera portion 8 such that an image at the back of the displaying portion 6 can be picked up. When a subject is located in front of the user, the user can check the picked-up image displayed on the displaying portion 6 during the shooting. Both the second camera portion 9 and the foregoing first camera portion 8 produce the image information by converting an incident light caught from the subject as a light signal into an electric signal via an photoelectric converting element such as CCD (charge coupled device), or the like through a group of lenses. This image information is processed by the image processing portion 19, and then the image is produced on the displaying portion 6.

Therefore, the displaying portion 6, the first camera portion 8, and the second camera portion 9 are connected to the image processing portion 19. The image information picked up by the first camera portion 8 and the second camera portion 9 are recorded in the information recording portion 20 after predetermined shootings are completed. Here, the information recording portion 20 can record phone number information, sound information, image information (received image information, and the like) other than the picked-up image information, character information such as e-mail in preparation or transmitted/received, and the like, in addition to this image information.

The first magnet 10 is arranged in the position that overlaps with the Hall element 25 on the lower end side of upper case 2 when the main body portion 1 is set in the close state.

The first operating portion 11 includes a plurality of operation buttons arranged at the lower end of the main surface 2A of the upper case 2. The first operating portion 11 includes a call receiving button and a call ending button, operation buttons for adjusting a sound volume output from the receiver 5 or the speaker 24, switching the operation mode to a manner mode, etc., a choosing button and an OK button on a menu screen, and the like.

The first printed board 12 is arranged under the displaying portion 6.

The antenna 13 is arranged at the top end of the upper case 2 adjacent to the second camera portion 9.

Then, the lower case 3 will be explained hereunder.

The second operating portion 23 includes a plurality of operation buttons arranged on the main surface of the lower case 3. Numerals, characters, symbols are printed on the second operating portion 23 to input the phone number, the characters, etc.

The microphone 22 as well as the second operating portion 23 is arranged on the main surface 3A of the lower case 3. The microphone 22 is provided such that is covered with the upper case 2 when the main body portion 1 is in the close state and is exposed when the main body portion 1 is in the open state.

The speaker 24 constitutes a second sound outputting portion, and outs the ringer tones, the voice output at a time of hands-free operation, and the like.

The Hall element 25 is provided on the second printed board 26 such that this Hall element opposes to the first magnet 10 when the main body portion 1 is in the close state. Since the first magnet 10 is positioned in close vicinity of the Hall element 25 when the main body portion 1 is in the close state, the Hall element 25 detects a magnetic field of the first magnet 10 and outputs a detection signal to the controlling portion 21. Also, the first magnet 10 is positioned remotely from the Hall element 25 when the main body portion 1 is in the open state, the Hall element 25 cannot detect a magnetic field of the first magnet 10 and does not output the detection signal to the controlling portion 21. That is, the main body portion 1 is in the close state when the Hall element 25 detects the magnetic field of the first magnet 10, while the main body portion 1 is in the open state when the Hall element 25 does not detect the magnetic field of the first magnet 10.

When the first operating portion 11 is operated in a situation that the main body portion 1 is in the close state, a light source for illuminating the first operating portion 11 is turned ON. Unless the first operating portion 11 is operated for a predetermined time, the illumination is turned OFF. When the main body portion 1 is changed from the close state to the open state, light sources for illuminating the first operating portion 11 and the second operating portion 23 respectively are also turned ON. Thus, the user can look at clearly the characters, the symbols, etc. on the first operating portion 11 and the second operating portion 23. When the main body portion 1 is changed from the open state to the close state, both light sources for illuminating the first operating portion 11 and the second operating portion 23 respectively are turned OFF. Thus, the consumption power can be reduced.

The second printed board 26 is provided around the battery 28. The connectors (not shown) connected to the UIM card fitting portion 27 and the battery 28 are provided to a part of the second printed board 26.

The controlling portion 21 is connected to the first operating portion 11, the second operating portion 23, the Hall element 25, the radio circuit portion 15, the data converting portion 17, the image processing portion 19, and the information recording portion 20 to control the operations of these portions. Also, the controlling portion 21 is connected to the battery 28.

The radio circuit portion 15 is connected to the antenna 13 via the matching circuit portion 16. The radio circuit portion 15 is constructed to process the data received via the antenna 13 and output such data to the data converting portion 17. The matching circuit portion 16 matches the impedance of the antenna 13 to the impedance of the radio circuit portion 15. In contrast, the data converting portion 17 is connected to the sound processing portion 18, and the sound processing portion 18 is connected to the receiver 5, the speaker 24, and the microphone 22 respectively.

Therefore, the data converting portion 17 converts the data received from the antenna 13 into the sound data via the matching circuit portion 16, the radio circuit portion 15, and the controlling portion 21, and outputs the sound data to the sound processing portion 18.

The sound processing portion 18 produces a sound signal by decoding the sound data, and then outputs the sound signal to the receiver 5 and the speaker 24. The receiver 5 and the speaker 24 output the sound corresponding to the sound signal transmitted from the sound processing portion 18.

Also, the sound processing portion 18 produces sound data by coding the sound that the microphone 22 receives, and outputs the sound data to the data converting portion 17. The data converting portion 17 converts the input sound data into communication data, and then outputs the communication data to the radio circuit portion 15. The radio circuit portion 15 processes the received communication data, and sends out the processed data from the antenna 13 as an electronic radio wave of the radio signal.

When the main body portion 1 is in the close state, the folded portion of the flexible printed board 39 is formed in the position adjacent to the second camera portion 9. When the main body portion 1 is moved to the open state, the folded portion of the flexible printed board 39 moves, and the state of the folded portion after moved is illustrated in FIG. 7(b).

The connecting portion 4 will be described in detail with reference to FIG. 4 and FIG. 5 hereunder.

In FIG. 4, the guide rail portion 31, the base portion 32, and the housing member 37 are formed of a nonmagnetic metal thin plate respectively. The attracted member 38 is formed of a magnetic metal thin plate.

The base portion 32 has a first center portion 41, a U-shaped guiding portion 42 formed to oppose to each other at both ends of the first center portion 41, a pair of holding portions 43 formed on the first center portion 41 and folded to oppose to each other, a first hole 44 into which the UIM card fitting portion 27 is fitted, and a second hole 46 (a "first position" set forth in claims) to which the top end of the first rivet 34 is attached by the caulking after the first rivet 34 is passed through a first ring portion 45 that is formed at the top end of the arm on one end side of a coil portion 33A of the torsion coil spring 33.

The guide rail portion 31 has a second center portion 47, a slide portion 48 formed at both ends of the second center portion 47 and guided by the guiding portion 42 to slide, a third hole 50 (a "second position" set forth in claims) to which the top end of the second rivet 35 is attached by the caulking after the second rivet 35 is passed through a second ring portion 49 that is formed at the top end of the arm on the other end side of the coil portion 33A of the torsion coil spring 33, and a rectangular bent portion 52 having two projections 51.

One end of the torsion coil spring 33, in which the first ring portion 45 is formed, is turned/moved around the second hole 46 over the first center portion 41. The other end of the torsion coil spring 33, in which the second ring portion 49 is formed, is moved while facing to the back side of the main surface 3A of the lower case 3. The coil portion 33A is wound clockwise, and the second hole 46 is arranged near the third hole 50 in the arrow A direction when the main body portion 1 is in the close state. Also, the torsion coil spring 33 is fitted to the connecting portion 4 to have a predetermined torsion angle. The coil portion 33A is arranged adjacent to a C-surface portion 29A, one corner of which corresponding to the substantially rectangular UIM card 29 (indicated with a chain double-dashed line in FIG. 6(a), FIG. 6(b)) is formed as an oblique surface, between the first hole 44 and the rectangular bent portion 52. When the coil portion 33A is arranged between the first hole 44 and the rectangular bent portion 52 not to position next to the C-surface portion 29A, a distance between first hole 44 and the rectangular bent portion 52 must be increased unless a diameter of the coil portion 33A is reduced. Consequently, an increase of a total length of the main body portion 1 is brought about. When a diameter of the coil portion 33A is reduced, it is feared that a produced bending stress is increased and exceeds an allowable stress unless a torsion angle given to get a desired open/close force is reduced. Therefore, it is not preferable that a diameter of the coil portion 33A should be reduced.

Like Embodiment 1, a space in the main body portion 1 can be utilized effectively by arranging the coil portion 33A adjacent to the C-surface portion 29A, and also a size suitable for the portable terminal can be realized by avoiding an increase of the total length of the main body portion 1. Also, the main surface 3A of the lower case 3 is formed on the surface side of the base portion 32 (on the opposite side to the side surface to which the battery 28 is fitted) to create a clearance in which the coil portion 33A and the UIM card fitting portion 27 are provided. The main surface 3A of the lower case 3 is positioned between the first operating portion 11 of the upper case 2 and the guide rail portion 31.

Also, the battery 28 is loaded on the back surface side of the base portion 32. The first printed board 12 and the displaying portion 6 are mounted on the surface side of the guide rail portion 31.

According to such configuration, a space that is not utilized actually is minimized in the main body portion 1 that is put in the close state. Thus, a size reduction and a thickness reduction of the main body portion 1 can be achieved.

In FIG. 5, the second magnet 36 whose magnetized direction is directed in an arrow B direction is housed in the housing member 37. The housing member 37 is formed by a plurality of bent portions such that the substantially rectangular second magnet 36 can be installed into the housing member 37.

A fourth hole 53 having a width W1 is formed in the holding portions 43. When the housing member 37 is fitted to the holding portions 43, a folding piece 54 formed on the side surface of the housing member 37 to have a width W2 (W1>W2) engages with the fourth hole 53 to bend. The folding piece 54 latches into the fourth hole 53 after the engagement, and thus the folding piece 54 is not disconnected. Also, the housing member 37 can be moved by a clearance (W1−W2) produced after the engagement in the arrow B direction. In other words, a movement of the housing member 37 is restricted within a clearance (W1−W2) by the holding portions 43 in the arrow B direction. This clearance (W1−W2) is sufficiently small in contrast to the length L.

The projection 51 is fitted into two through holes 55 provided in the attracted member 38 respectively, and is secured to through holes 55 by the caulking respectively. Thus, the attracted member 38 is fitted integrally to the rectangular bent portion 52.

Next, an operation will be explained with reference to FIG. 6 and FIG. 7 hereunder. As shown in FIG. 6(a) and FIG. 7(a), the first center portion 41 overlaps with the second center portion 47 when the main body portion 1 is in the close state. The coil portion 33A of the torsion coil spring 33 is arranged in the position between the first hole 44 and the rectangular bent portion 52 on the first center portion 41. The attracted member 38 is attracted by the second magnet 36, so that the attracted member 38 and the housing member 37 are brought into tight contact with each other. In FIG. 7(a), a clearance 56 in which the coil portion 33A is housed/arranged is indicated by an oblique line. This clearance 56 is formed in the area that is surrounded by a part of the back surface of the main surface 2A of the upper case 2, a part of the back surface of the main surface 3A of the lower case 3, the rectangular bent portion 52 of the guide rail portion 31, the first center portion 41 of the base portion 32, and the UIM card fitting portion 27.

When the main body portion 1 is changed from the close state to the open state, the main body portion 1 together with the guide rail portion 31 moves in the arrow A direction, as shown in FIG. 6(b) and FIG. 7(b). Thus, the attracted member 38 and the housing member 37 move away mutually, and the UIM card fitting portion 27 and the rectangular bent portion 52 move away mutually, so that the main surface 3A of the lower case 3 is exposed. At the same time, the coil portion 33A follows the rectangular bent portion 52 while the torsion coil spring 33 is turning clockwise around the first rivet 34. Here, since the guide rail portion 31 takes a straight-line motion but the coil portion 33A takes a rotating motion, the coil portion 33A never abuts against the rectangular bent portion 52. In FIG. 7(b), a clearance 57 in which the coil portion 33A is housed/arranged is indicated by an oblique line.

The position of the coil portion 33A located when the main body portion 1 is in the open state corresponds to the position in which the guide rail portion 31 is located when the main body portion 1 is in the close state. Since the guide rail portion 31 moves by a distance L in the arrow. A direction, the clearance 56 is increased by a distance L in the proceeding direction to create the clearance 57.

In the prior art, the space in which the coil portion is positioned when the main body portion 1 is in the open state must be formed previously even when the main body portion 1 is in the close state. Therefore, it is difficult to reduce a thickness and a length of the main body portion 1 that is in the close state. In order to solve this problem, in Embodiment 1, the space in which the coil portion 33A is arranged is expanded (extended) along with the movement of the upper case 2 by an amount of movement of the upper case 2. The space in which the coil portion 33A is arranged in the close state can be ensured by placing the coil portion 33A in the extended clearance 56.

Also, the second magnet 36, the housing member 37, and the attracted member 38 are arranged in the extended clearance 56. As a result, like the case where the coil portion 33A is arranged in the extended clearance 56, the space in which the attracted member 38 is provided can be ensured when the main body portion 1 is in the open state.

That is, since the coil portion 33A, the second magnet 36, and the attracted member 38 are arranged in the extended clearance 56, there is no necessity to form previously the space in which the coil portion is arranged when the main body portion 1 is in the open state. Therefore, the space in the main body portion 1 can be utilized effectively.

When the main body portion 1 is changed from the open state to the close state, the upper case 2 as well as the guide rail portion 31 moves in the opposite direction to the arrow A direction. Thus, the attracted member 38 comes close to the housing member 37 and also the rectangular bent portion 52 comes close to the UIM card fitting portion 27, whereby the main surface 3A of the lower case 3 is covered with the upper case 2. At the same time, the coil portion 33A follows the rectangular bent portion 52 while the torsion coil spring 33 is turning clockwise around the first rivet 34. Here, since a part of the clearance 57 is located on the upper surface side of the coil portion 33A (the upper case 2 side) when the main body portion 1 is in the open state, the coil portion 33A can be raised with respect to the first center portion 41. When the main body portion 1 is closed from the open state, the second ring portion 49 of the torsion coil spring 33 enters into the back side of the coil portion 33A of the lower case 3 ahead of the coil portion 33A. Therefore, the upper surface side of the coil portion 33A that is wound clockwise can be guided and can enter into the back side.

Assume that the coil portion 33A of the torsion coil spring 33 is wound counter clockwise, one end having the first ring portion 45 is formed from the upper surface side of the coil portion 33A, while the other end having the second ring portion 49 is formed from the lower surface side of the coil portion 33A (the base portion 32 side). In this case, the second ring portion 49 enters into the back side of the main surface 3A of the lower case 3 ahead of the coil portion 33A when the main body portion 1 is closed from the open state. However, when the upper surface side of the coil portion 33A is raised, the coil portion 33A hits a top end 3B of the main surface 3A before it enters into the back side of the main surface 3A of the lower case 3. Therefore, a clearance between the upper surface side of the coil portion 33A and the back side of the main surface 3A of the lower case 3 must be kept largely, which yields an increase of a thickness of the main body portion 1.

Accordingly, like Embodiment 1, when such a configuration is employed that the coil portion 33A goes in and out of the space of a predetermined height, the winding direction of the coil portion 33A may be set such that, when the main body portion 1 is changed from the open state to the close state, the other end having the second rivet portion 49 as the top portion is started from the upper surface of the coil portion 33A.

In Embodiment 1, the first ring portion 45 and the second ring portion 49 are formed in the top ends of one end and the other end of the torsion coil spring 33 respectively. But the torsion coil spring 33 is not limited to this configuration. The top ends of the torsion coil spring 33 may be folded and engaged with the second hole 46 and the third hole 50.

Next, a sliding force will be explained with reference to FIG. 8 and FIG. 9 hereunder. Here, FIG. 8 is a conceptual view in which the connecting portion is replaced with a spring-mass system. As shown in FIG. 8, when the torsion coil spring 33 is replaced with a linear spring, an energizing force (spring force) is applied: the first rivet 34 and the second rivet 35 of the guide rail portion 31 represented by a mass m. The mass m is energized along the guiding portion 42 to produce a frictional force. When an angle between the first rivet 34 and the second rivet 35 is θ, a spring force out of the sliding force produced when the mass m is slid in the arrow A direction is given by a product of a spring force produced by the torsion coil spring 33 and a cosine θ.

FIG. 9 is a graph showing measured results of the sliding force applied when the upper case 2 is opened from its closed state to its opened state while the lower case 3 is fixed. When the main body portion 1 is in the close state, the second magnet 36 is attracting the attracted member 38. Thus, the sliding force required when the main body portion 1 is opened from the close state is given by a sum of a spring force of the torsion coil spring 33, an attracting force of the second magnet 36, and a frictional force. When the upper case 2 is slid until the second magnet 36 is separated from the attracted member 38, an attracting force of the second magnet 36 acting on the attracted member 38 approaches zero to the utmost. Therefore, the sliding force is given by a sum of a spring force of the torsion coil spring 33 and a frictional force. It is understood from FIG. 9 that the sliding force is lowered suddenly when the upper case 2 moves by a distance α.

Assume that the second magnet 36 in Embodiment 1 is not provided, the sliding force in the close state goes to a point E. When an attracting force of the second magnet 36 is applied, the sliding force is increased to a point F from the point E.

When the upper case 2 is moved by almost L/2 in the arrow A direction, a distance between the first rivet 34 and the second rivet 35 becomes shortest and an angle θ between them is 90 degree. As a result, an energizing force becomes zero. When the upper case 2 is moved in the arrow A direction to exceed almost L/2, the direction of the energizing force is reversed and the main body portion 1 is shifted semiautomatically to the open state.

The energizing force is produced similarly when the main body portion 1 is closed from the open state.

Next, an operation of the second magnet 36 when the main body portion 1 is closed will be explained hereunder. When the attracted member 38 hits the housing member 37 that contains the second magnet 36, an impact force is applied to the second magnet 36. At this time, this impact force that is applied to the second magnet 36 brings about the failure of this magnet at times in a situation that the second magnet 36 is fixed rigidly to the base portion 32. Also, when the user takes the portable terminal out of the pocket but drops the portable terminal by mistake on the ground, sometimes the portable terminal of this type applies the impact force to the second magnet 36.

Therefore, in Embodiment 1 of the present invention, the housing member 37 is held such that this member is allowed to move by a distance (W1–W2) when the attracted member 38 hits abruptly the housing member 37 that contains the second magnet 36, or the like. As a result, the failure of the second magnet 36 is avoided.

Also, the main body portion 1 is constructed by a large number of components. Because of variation in manufacture, variation in a component dimension, and the like, variation in the previously set position of the close state is caused, for example, opposing side surfaces of the housing member 37 and the attracted member 38 are not set in parallel, or the like. Therefore, in order to make it possible to keep tight contact of the housing member 37 and the attracted member 38 without fail even when the normal position of the close state is varied, the housing member 37 is arranged to move by a distance (W1–W2) and the direction toward which the housing member 37 is directed can be corrected within a range (W1–W2). Thus, the opposing side surfaces of the housing member 37 and the attracted member 38 can be set in parallel. In Embodiment 1, an amount of movement of the housing member 37 is equally assigned to the arrow A direction and the opposite direction around the normal position of the close state. But an amount of movement may be set appropriately.

In Embodiment 1, as described above, the housing member 37 can be moved in the sliding direction. As other embodiment, an elastic member formed of a cushion, or the like may be interposed between the rectangular bent portion 52 and the attracted member 38 to be compressed in the normal position. In this case, when the opposing side surfaces of the housing member 37 and the attracted member 38 are not set in parallel, the elastic member is compressed unevenly to correct an inclination.

Also, as an example in which the housing member 37 is not used, the second magnet 36 may be opposed directly to the attracted member 38. In this case, the elastic member may be provided on the back surface of the opposing surface of the second magnet 36 opposing to the attracted member 38, and then the second magnet 36 may be energized/hit against the attracted member 38. At this time, when the opposing side surfaces of the second magnet 36 and the attracted member 38 are not set in parallel, the elastic member is compressed unevenly to correct an inclination. Thus, the opposing side surfaces of the second magnet 36 and the attracted member 38 can be set in parallel.

Also, the second magnet 36 is explained as the structure that attracts the attracted member 38 when the main body portion 1 is in the close state. But the second magnet 36 may be constructed to attract the attracted member in the open state or both states.

Here, the housing member 37 is employed to simplify the fitting process of the second magnet 36. But the second magnet 36 may be adheres/fixed to the base portion 32 or may be housed in a housing member that has another shape. Also, a magnetic metal body (yoke) may be provided on one side surface of the magnet and magnetized, and then this yoke may be opposed to the attracted member. In this case, the yoke may be provided to move and may attract the attracted member, and others. The second magnet 36 is not limited to the modes described in Embodiment 1.

That is, in a situation that the magnet attracts the attracted member to hold the close state and the open state of the main body portion, when the magnet or the magnetic material held integrally with the magnet and the attracted member that the magnet or the magnetic material attracts has an inclination on attracted side surfaces and are not set in parallel, any one of two members may be caused to correct the inclination.

Also, in Embodiment 1, the connecting portion for coupling the upper case and the lower case slidably is provided exclusively. In this case, guide rail portion may be formed integrally with the upper case, the base portion may be formed in the lower case, and a spring member such as a torsion coil spring, a compression spring, an extension spring, or the like, which applies an energizing force to two cases, may be provided between the upper case and the lower case.

As explained above, the torsion coil spring 33 is arranged such that one end of the coil portion 33A is fixed to the second hole 46 that moves along with the lower case 3, the other end of the coil portion 33A is fixed to the third hole 50 that moves along with the upper case 2, and the coil portion 33A is positioned in the clearance 56. The clearance 56 is arranged in the third hole 50 near the arrow A direction when the main body portion is in the close state. The coil portion 33A and the rectangular bent portion 52 never interfere with each other even when two cases 2, 3 do the slide operation. Also, since it is not needed to form the space, in which the coil portion 33A is positioned in the open state, in advance in the close state, the space in the main body portion 1 can be utilized effectively, and thus a size reduction of the main body portion 1 can be attained.

Also, such a configuration is employed that the second magnet 36 attracts the attracted member 38 in the close state and the attracted member 38 that attracts the second magnet 36 can be moved in the sliding direction. Therefore, the failure of the second magnet 36 can be avoided. Also, even though variation in manufacture, variation in a component dimension, and the like are caused, the close state can be maintained surely by an action of the attracting force.

In Embodiment 1, the common torsion coil spring whose coil average diameter of the torsion coil portion is set uniform throughout all turns is employed. As other embodiment, the coil portion may be shape like a spiral such as a spiral spring. Also, when the compression spring or the extension spring is employed instead of the torsion coil spring, the containing position in the open state can be ensured by arranging the coil portion in the expanded/contracted space even though the space in which the coil portion is positioned in the open state is not formed in advance in the close state.

Also, in Embodiment 1, first the interior of the cases can be utilized effectively by arranging the coil portion in the space that is extended when the main body portion is changed from the close state to the open state. Second the magnet that keeps the close state or the open state can be employed and the fitting structure to prevent the failure of this magnet can be realized. But both structures may not always be realized at the same time. Namely, the present invention is not limited to above Embodiment 1 at all, and the present invention can be selected and embodies in various modes without departing from a gist or a scope of the present invention.

Embodiment 2

A variation of the torsion coil spring will be explained hereunder. The torsion coil spring repeats the deformation from a maximally opened state to a minimally closed state. A minimum bending stress caused when this coil spring is opened at maximum, a maximum bending stress caused when this coil spring is closed at minimum, and a ratio of two bending stresses are related to durability of this torsion coil spring. In particular, in order to enhance the durability, it is important that the maximum bending stress should be reduced sufficiently small. For this purpose, it is preferable that the number of turns of the coil should be increased or the coil average diameter should be increased. On the contrary, the space (area or height) that the torsion coil spring occupies is increased, and upsizing of the device is brought about.

Embodiment 2 that implements the torsion coil spring whose maximum stress is reduced will be explained hereunder.

Figure 10:
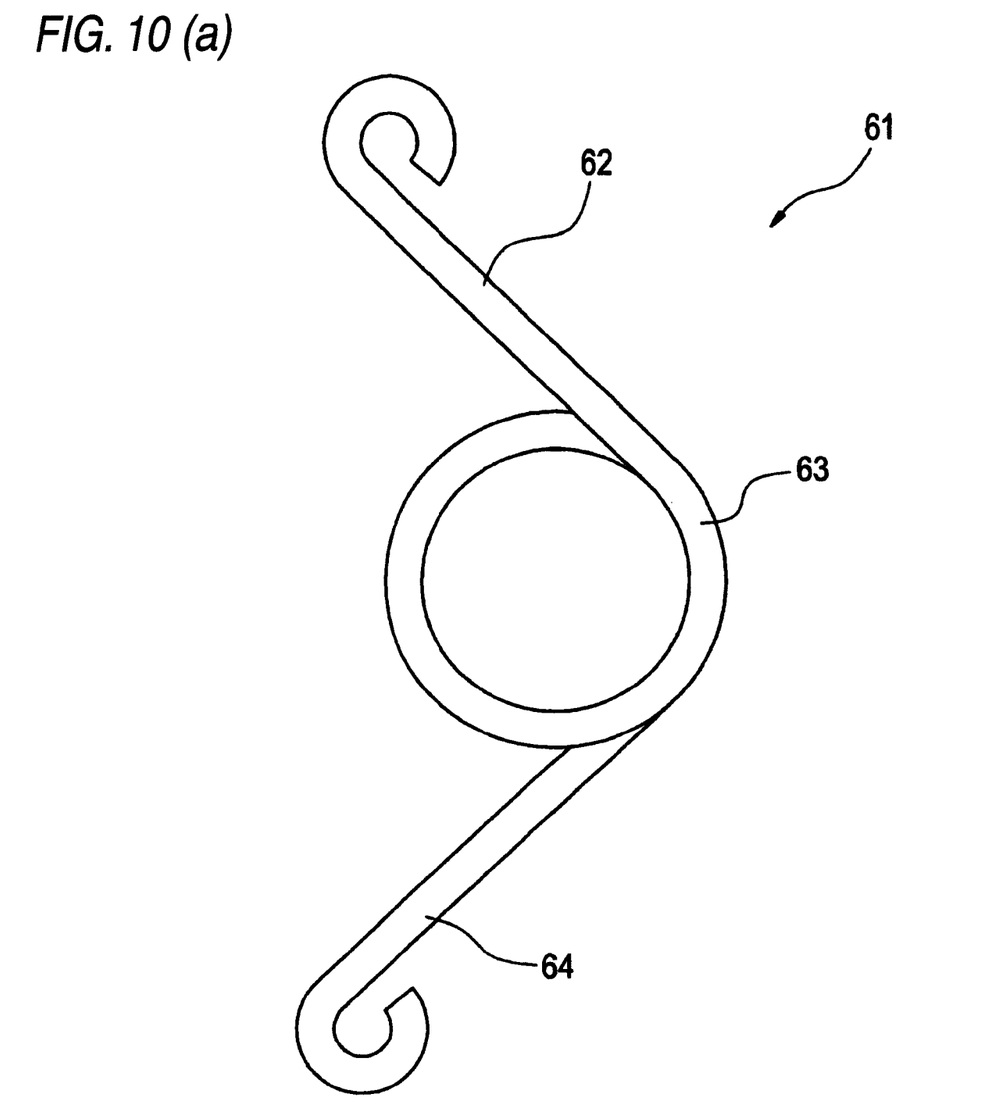
Figure 11:
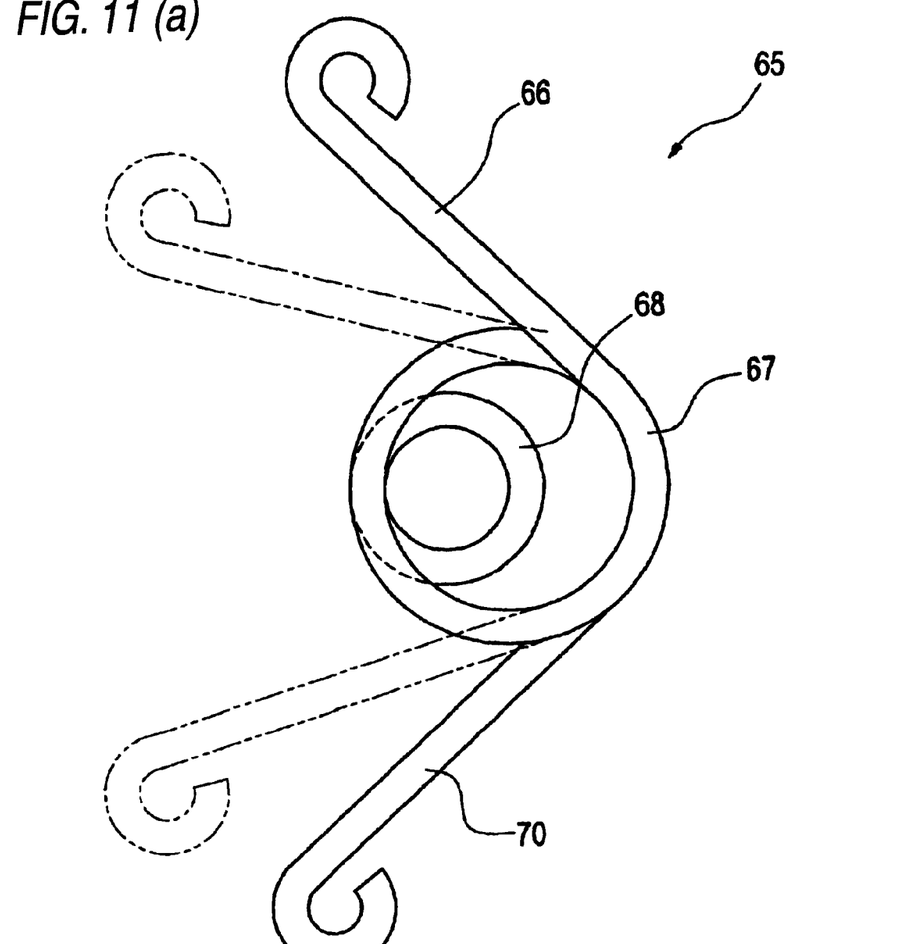

FIG. 10 shows a torsion coil spring in the prior art, wherein (a) is a plan view, and (b) is a center sectional view. FIG. 11 shows a torsion coil spring in Embodiment 2 of the present invention, wherein (a) is a plan view, and (b) is a center sectional view.

First, the conventional torsion coil spring will be explained hereunder. In FIG. 10, a torsion coil spring 61 includes a 10-th arm portion A 62, a 10-th center coil portion A 63 that is wound clockwise from the end portion of the 10-th arm portion A 62 to have a large diameter, and a 10-th arm portion B 64 to which the 10-th center coil portion A 63 is connected after the 10-th center coil portion A 63 is wound by two turns. This torsion coil spring 61 is a torsion coil spring whose number of turns is two. At this time, a thickness H1 of the thickness H1 is three times of a line diameter [(number of turns N+1)×(line diameter)].

In contrast, in FIG. 11, a torsion coil spring 65 of Embodiment 2 includes a 11-th arm portion A 66, a 11-th center coil portion A (the same diameter as the 10-th center coil portion A) 67 that is wound clockwise from the end portion of the 1-th arm portion A 66 and has a large diameter, a 11-th center coil portion B 68 that is wound clockwise subsequently after the 11-th center coil portion A 67 is wound by about ⅔ turn and has a small diameter, a 11-th center coil portion C (the same diameter as the 11-th center coil portion A) 69 that is wound clockwise by about ½ turn subsequently after the 11-th center coil portion B 68 is wound by one turn, and a 11-th arm portion B 70 connected to the termination end of the 11-th center coil portion C 69.

In other words, since the 11-th center coil portion B 68 having a small diameter is interposed before the 11-th center coil portion C 69 formed at the last and having a large diameter is formed, the torsion coil spring 65 of Embodiment 2 expands a developed effective length (a length from the top end of the 11-th arm portion A 66 to the top end of the 11-th arm portion B 70) rather than the torsion coil spring 61 in the prior art. Also, a thickness H2 of the torsion coil spring 65 is three times of the line diameter.

Here, when the 11-th center coil portion B 68 having a small diameter has a large diameter (the same diameter as the 11-th arm portion A 66), the number of effective turns is three, and the thickness H2 of the torsion coil spring 65 is four times of the line diameter.

Therefore, the developed effective length is larger than that in the case where the number of effective turns is two, but is smaller than that in the case where the number of effective turns is three. Also, a height of the torsion coil spring 65 is set to the same extent as the case where the number of effective turns is two.

Also, an angle between the 11-th arm portion A 66 and the 11-th arm portion B 70 of the torsion coil spring 65 is an angle α that is less than 180 degree when the main body portion 1 is in the close state or the open state. An angle between the 11-th arm portion A 66 and the 11-th arm portion B 70 is an angle β when the main body portion 1 is in an intermediate state between the close state and the open state. The 11-th arm portion A 66 and the 11-th arm portion B 70 are indicated with a chain double-dashed line in this intermediate state. The termination end of the 11-th center coil portion A 67 started from the termination end of the 11-th arm portion A 66 overlaps with the starting end and the termination end of the 11-th center coil portion B 68 started from this termination end in the almost center (α/2) position of the angle α (or the position in which the termination end of the 11-th arm portion A 66 and the termination end of the 11-th arm portion B 70 are arranged symmetrically with respect to the axis of the center coil portion as the symmetrical axis).

In this case, a diameter of the 11-th center coil portion B 68 may be set such that this center coil portion does not interfere with the 11-th arm portion A 66 and the 11-th arm portion B 70 when the 11-th arm portion A 66 and the 11-th arm portion B 70 are bent (the main body portion 1 is in the intermediate state between the open state and the close state).

That is, since the 11-th center coil portion B 68 of a small diameter is positioned not to overlap with the starting end of the first turn (the 11-th center coil portion A 67 formed prior to the 11-th center coil portion B 68) of the 11-th center coil portion A 67, a thickness (height) of the 11-th center coil portion B 68 is suppressed in contrast to the torsion coil spring 61 in the prior art.

A bending stress σ of the torsion coil spring is inversely proportional to the developed effective length (from JIS B 2709).

Accordingly, when the small-diameter coil portion is formed finally after the large-diameter center coil portion is formed, the developed effective length of the torsion coil spring can be prolonged not to increase a thickness of the spring. Therefore, a stress can be reduced in inversely proportional to the prolonged length.

In FIG. 11, the 11-th center coil portion B 68 of small diameter is positioned on the lower surface. But the 11-th center coil portion B 68 may be formed on the upper surface (state that is reversed from FIG. 11).

In short, the torsion coil spring, both ends of which are supported and which is fitted such that a torsion angle is changed, is formed such that the small-diameter center coil portion is started and terminated at neighborhood of the symmetrical positions of the starting positions of two arm portions with respect to the center of the large-diameter coil portion as the symmetrical axis on an uppermost surface and a lowermost surface of the center coil portion. Therefore, the developed effective length of the torsion coil spring can be prolonged by a surrounding length of the center coil portion of a small diameter.

The torsion coil spring described in Embodiment 2 is not limited to the situation that this coil spring is used in the connecting portion.

That is, such an advantage can always be achieved that the developed effective length of the torsion coil spring can be prolonged not to increase the thickness. Therefore, when the torsion coil spring is used such that the other end turns around one end and a torsion angle changes repeatedly from a first predetermined angle to a second predetermined angle, the longer life of the torsion coil spring can be achieved.

Here, in Embodiment 2, a variation of the torsion coil spring whose number of effective turns is two is explained. But the similar advantages can be achieved when the present invention is applied to the torsion coil spring whose number of effective turns is one or more.

With the above, various embodiments of the present invention are explained, but the present invention is not limited to the matters shown in the above embodiments. The present invention is susceptible to variations and adaptations, which are made based on the description of the specification and well known technologies by those skilled in the art and are contained in a scope over which a protection is sought.

This application is based upon Japanese Patent Application (Patent Application No. 2006-307754) filed on Nov. 14, 2006 and Japanese Patent Application (Patent Application No. 2007-088492) filed on Mar. 29, 2007; the contents of which are incorporated herein by reference.

INDUSTRIAL APPLICABILITY

According to the sliding portable terminal of the present invention, since the spring for applying the energizing force is arranged in the space that is extended when the mode of the cases is changed from the close state to the open state, the space necessary for the acting spring can be minimized. Also, the similar advantage can be achieved by arranging the magnet and the attracted member. Further, the failure of the magnet can be avoided when the open state and the close state are maintained by causing the magnet to attract the attracted member, and the attracted member can be attracted firmly when variation in components are caused. Therefore, various advantages, e.g., the open state and the close state can be kept without fail, and the like can be achieved. The sliding portable terminal of the present invention is suitable for the application in the slide device in the slidable small electronic equipment such as cellular phone, PDA, mobile PC, notebook PC, or the like.

The invention claimed is:

1. A sliding portable terminal, comprising:
a first case;
a second case having a protruded part extending in a protruding direction toward the first case;
a first connecting portion connected to the first case;
a second connecting portion connected to the second case and slidably coupled to the first connecting portion for sliding between an open state and a closed state; and
an elastic portion configured to provide, in the open state, a force to keep the open state, and, to provide, in the closed state, a force to keep the closed state, the elastic portion having a center coil portion between one end and an other end of the elastic portion, wherein in the opened state and the closed state, the center coil portion includes a large-diameter portion and a small-diameter portion which are spiraled and layered in a layered direction,
wherein, when projected in a plane perpendicular to the layered direction, the small-diameter portion is disposed at a substantially opposite position to a position where the spiral of the large-diameter portion starts and ends, with respect to a center of the large-diameter portion,
wherein
a first side space and a second side space are formed between the first connecting portion and the second connecting portion in the closed state, the first side space disposed outward of the protruded part in a direction perpendicular to both the sliding direction and the protruding direction, and the second side space disposed outward of the protruded part in a direction perpendicular to the protruding direction and parallel to the sliding direction, and
in the closed state, the one end of the elastic portion fixed to the first connecting portion is disposed in the first side space, and the other end of the elastic portion fixed to the second connecting portion is disposed in the second side space.

2. The sliding portable terminal according to claim 1, further comprising:
a magnet held on one of the first case and the second case; and
an attracted member held on the other of the first case and the second case and attracted by the magnet in the closed state,
wherein a magnetic force between the magnet and the attracted member provides a force to keep the closed state.

3. The sliding portable terminal according to claim 2, wherein at least one of the magnet and the attracted member is movable in the sliding direction when the magnet and the attracted member contact each other.

4. The sliding portable terminal according to claim 1, wherein
the protruded part having a c-surface part, and
a third side space is formed between the first connecting portion and the protruded part by the c-surface part, in the closed state, and
the center coil portion is, in the closed state, disposed in the third space.

* * * * *